Dec. 15, 1959 G. C. REISER ET AL 2,917,301
WEIGHBRIDGE
Filed Sept. 13, 1955 4 Sheets-Sheet 1
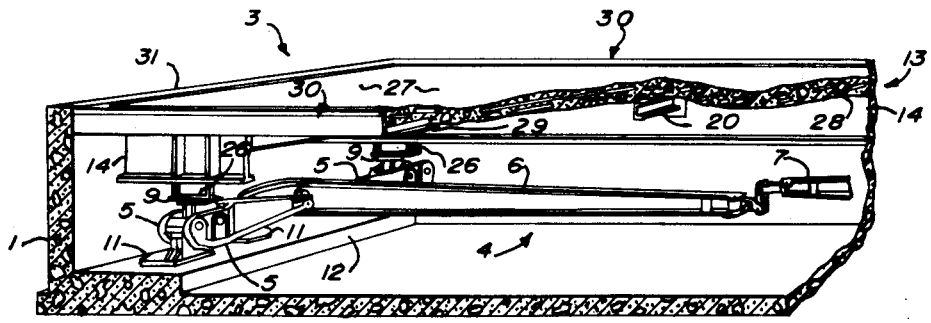
Fig. I
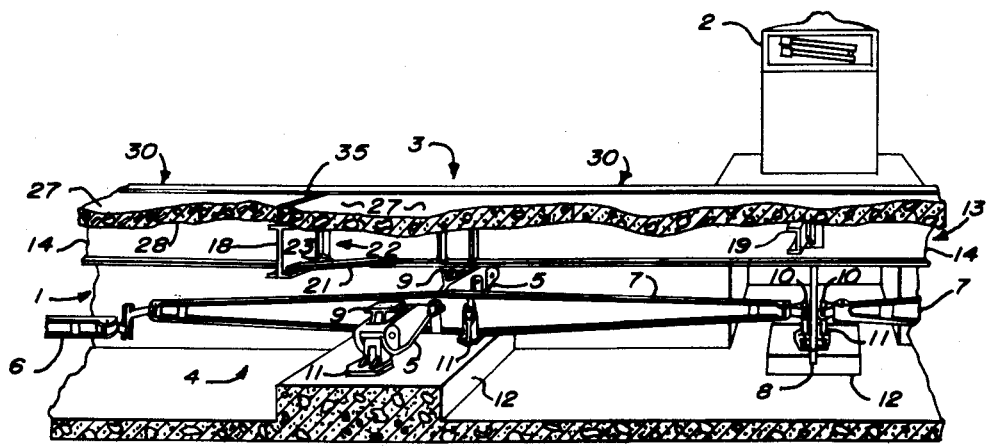
Fig. II
INVENTORS.
GEORGE C. REISER
CALVERT H. SHUPTRINE
BY
ATTORNEYS Dec. 15, 1959 G. C. REISER ET AL 2,917,301
WEIGHBRIDGE
Filed Sept. 13, 1955 4 Sheets-Sheet 2
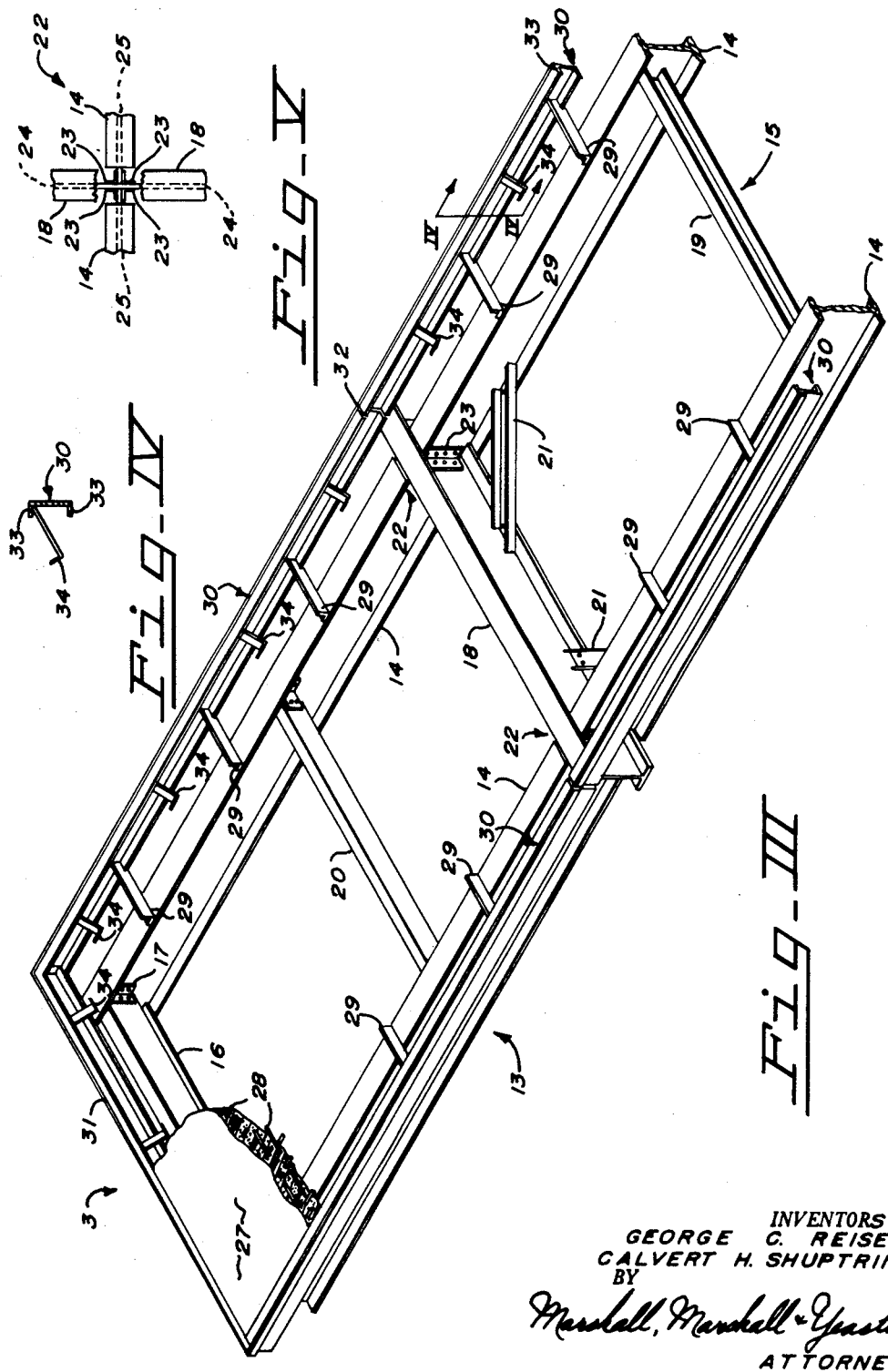
INVENTORS.
GEORGE C. REISER
CALVERT H. SHUPTRINE
BY
Marshall, Marshall & Yeasting
ATTORNEYS Dec. 15, 1959  G. C. REISER ET AL  2,917,301
WEIGHBRIDGE
Filed Sept. 13, 1955  4 Sheets-Sheet 3
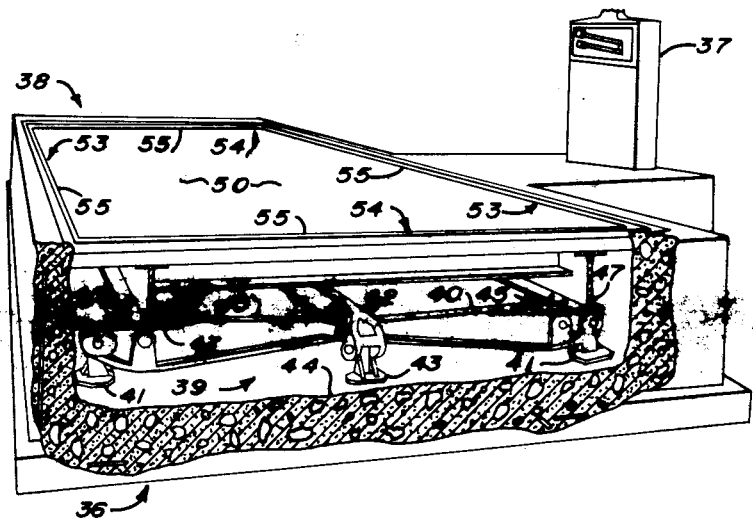
Fig. VII
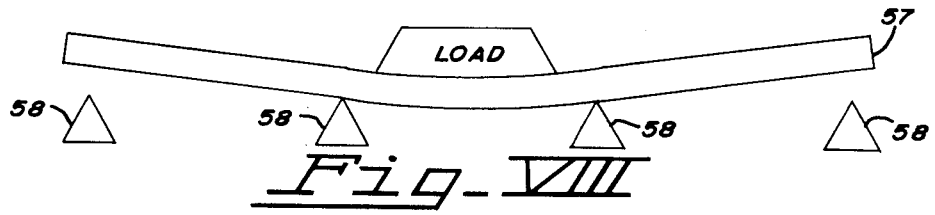
Fig. VIII
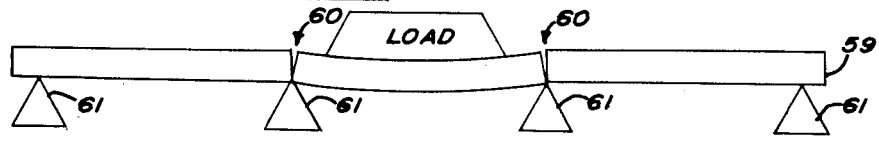
Fig. IX
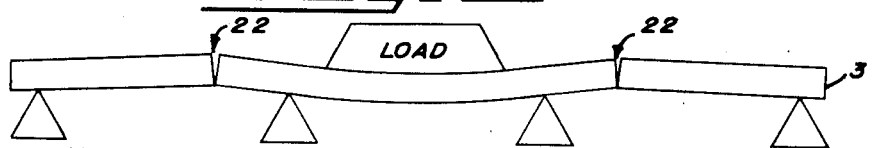
Fig. X
INVENTORS
GEORGE C. REISER
CALVERT H. SHUPTRINE
BY
*Marshall, Marshall & Gensting*
ATTORNEYS

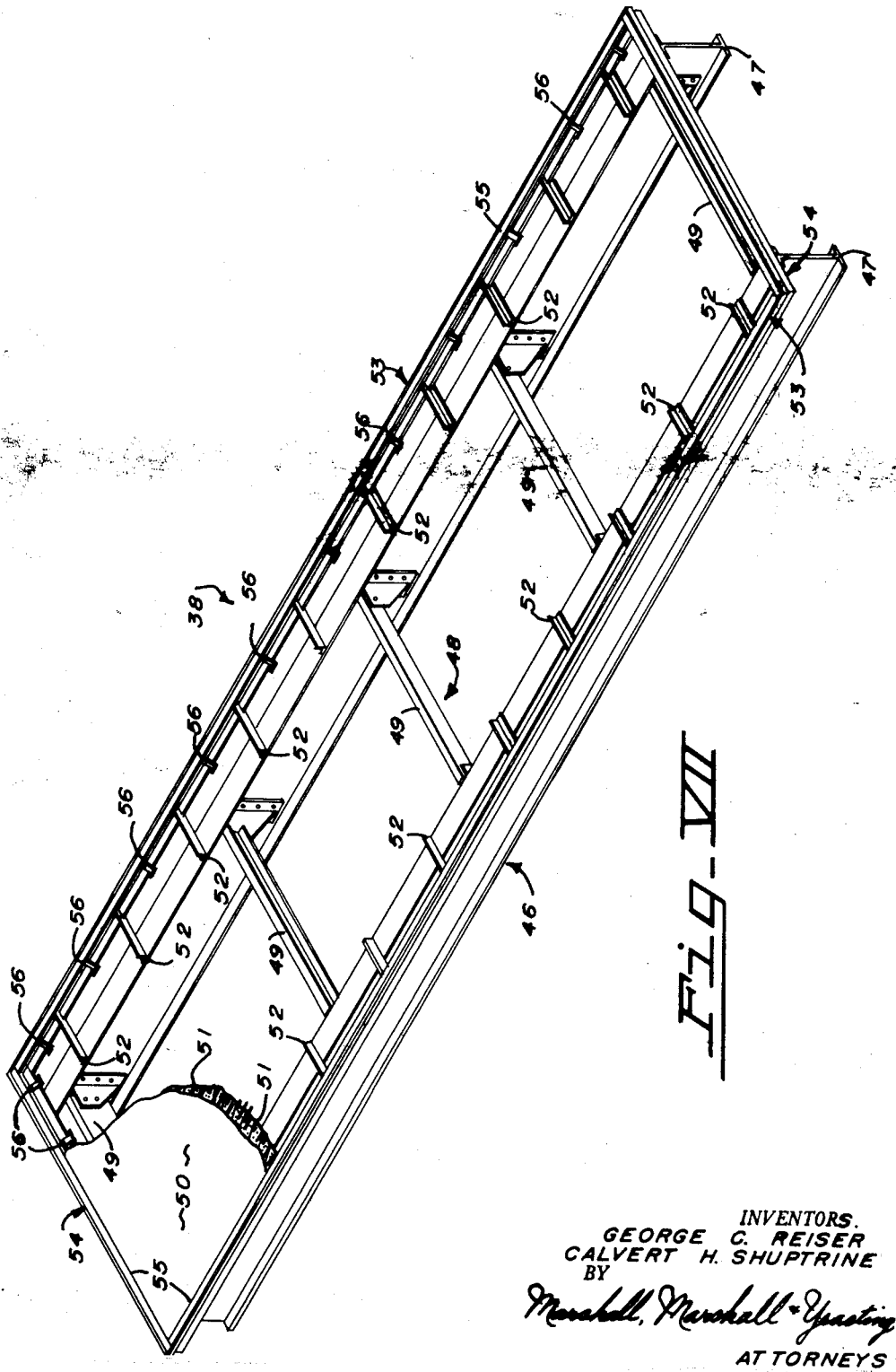

United States Patent Office 2,917,301
Patented Dec. 15, 1959

2,917,301

WEIGHBRIDGE

George C. Reiser and Calvert H. Shuptrine, Toledo, Ohio, assignors, by mesne assignments, to Toledo Scale Corporation, Toledo, Ohio, a corporation of Ohio Application September 13, 1955, Serial No. 533,945

6 Claims. (Cl. 265—71)

This invention relates to weighbridges and particularly to load receiving platforms employed in weighing scales designed to weight relatively heavy loads, such as loaded motor trucks.

The weighing of motor trucks, both when empty and when loaded, is a very important operation in industry and daily commerce. Weighing scales for this purpose have evolved from wagon scales used years ago. Modern truck scales are capable of weighing loaded truck-and-trailer combinations up to loads of 60 tons and have weighbridges as large as 60 feet by 10 feet. As the capacities of the weighing scales increased from the wood-decked wagon scales of yesterday to the concrete-deck truck scales of today, designers added more and more steel members to strengthen the weighbridges to withstand the greater loads encountered. Such increased use of steel together with the steadily increasing cost of steel have caused modern truck scale weighbridges to be very expensive.

The principal object of this invention is to provide an improved and rugged weighbridge that includes relatively little steel in its structure.

Another object of the invention is to provide, in a weighbridge having an I-beam frame and a composite steel and concrete slab carried by the frame, improved means for reinforcing the structure and knitting it together.

Still another object of the invention is to provide a cantilever weighbridge that is carried by the suspension bearing members of a weighing scale and that comprises an articulated frame, the weighbridge including relatively little steel in its structure.

More specific objects and advantages are apparent from the following description of specific embodiments of the invention.

Accordling to the invention, a heavy capacity weighing scale is provided with an improved weighbridge. The weighbridge comprises a composite steel and concrete deck rugged enough to support by itself loads within the capacity of the scale. The deck is carried by a relatively light-weight novel steel framework which includes a plurality of snags that are embedded in the composite deck to knit the framework and the deck together. One embodiment of the weighbridge, which is especially useful for weighing very heavy loads, is of a cantilever type and includes an articulated I-beam frame. It has been found that the cantilever span design allows the use of lighter weight structural steel members than those which are used in the simple spans of comparable size in the prior art and at the same time permits loads to be carried that are greater than those possible with such simple spans.

The invention may be more readily understood from the following detailed description of several specific embodiments in which reference is made to the accompanying drawings.

In the drawings:

Figure I is a perspective view of part of a four-section weighing scale embodying the invention.

Figure II is a perspective view of another part of the weighing scale shown in Figure I, the left end of Figure II showing fragments of elements fragments of which are shown at the right end of Figure I.

Figure III is a perspective view of that part of the weighbridge shown in Figures I and II with most of its composite steel and concrete deck broken away to exhibit interior details.

Figure IV is a vertical sectional view taken along the line IV—IV of Figure III.

Figure V is a fragmentary plan view of one of the joints between the longitudinally extending I-beam and the transversely extending reinforcing I-beam shown in Figure III, the transversely extending I-beam being broken away at the joint to exhibit details.

Figure VI is a perspective view of a two-section weighing scale embodying a second embodiment of the invention.

Figure VII is an enlarged perspective view of the weighbridge shown in Figure VI with most of its composite steel and concrete deck broken away to exhibit interior details.

Figure VIII is a sketch illustrating the action of a non-articulated weighbridge under load.

Figure IX is a sketch illustrating the action of an articulated weighbridge of simple span design under load.

Figure X is a sketch illustrating the action of an articulated weighbridge of cantilever span design under load.

Referring to Figures I and II, a weighing scale pit 1 of a four-section truck scale, as well as a cabinet 2 or other supporting means for tare offsetting and load counterbalancing mechanism, may be of any preferred construction, and is illustrated herein merely to show the relation of an improved weighbridge 3 thereto. It should be understood that Figure I shows the left end of part while Figure II shows a middle part of the same weighing scale. Figures I and II together illustrate only about one-half of the scale because of its very large size, the part of the scale to the right of the cabinet 2 as viewed in Figure II being like the part of the scale to the left of the cabinet shown in Figures I and II. Such a weighing scale may have a capacity of 60 tons and a weighbridge 60 feet by 10 feet, being built to weigh very large and heavy highway vehicles.

The lever mechanism 4 may also be of any preferred construction, that illustrated being a thirteen-lever system including eight main levers 5 (four of which are shown) two end levers 6 (one of which is shown), two longitudinal extension levers 7, and one transverse lever 8. Each pair of main levers 5 is comprised in a section; therefore the scale illustrated is a four-section scale.

The weighbridge 3 and load are supported at eight points, i.e., by the usual load pivots of each main lever 5, upon which rest suspension bearing members 9 that carry the weighbridge. A load applied to the main levers 5 at the ends of the scale, i.e., the two pairs of main levers 5 which are located at the very ends of the scale, causes a downward pull on the end levers 6. This pull is transmitted to the longitudinal extension levers 7 causing an upward pull at connections 10 between the two longitudinal extension levers 7 and the transverse lever 8. A load applied to the other main levers 5 also acts on the longitudinal extension levers to cause an upward pull at the connections 10. The end of the transverse lever 8 near the cabinet 2 rocks downwardly under the influence of an upward pull at the connections 10 causing, in turn, a downward pull on a steelyard rod (not shown) extending upwardly within the cabinet. Each of the thirteen levers is fulcrumed on stands 11 supported upon composite steel and concrete piers 12 rising from the floor of the pit 1.

Referring now to Figure III, the weighbridge 3 includes an articulated I-beam frame 13 comprising three pairs of longitudinally extending I-beams 14 and a plurality of reinforcing members 15 holding the I-beams 14 in spaced apart relationship. Only about one-half of the weighbridge 3 is illustrated in Figure III because of its large size, the half not shown being like the part illustrated.

The reinforcing members 15 include a transversely extending I-beam 16 at each end of the frame 13, the I-beam 16 being fixed to brackets 17, one of which is shown, attached to the beams 14, and a pair of transversely extending I-beams 18 one of which is spaced roughly one-third of the length of the weighbridge 3 in from one of its ends and the other of which is equally spaced from the other end of the weighbridge. The transversely extending I-beams 18 flexibly connect the center pair with the end pairs of longitudinally extending I-beams 14. The reinforcing members also include a channel iron 19 connecting the center pair of longitudinally extending I-beams 14 at the middle of the weighbridge 3, a pair of channel irons 20 one of which is located about midway between each of the transversely extending I-beams 16 and 18, and four short channel irons 21 each of which extends at an angle from a point near the end of one of the transversely extending I-beams 18 to a point near the end of one of the center longitudinally extending I-beams 14.

The flexible connections or joints 22 between the center and the end longitudinally extending I-beams 14 are necessary so that a load will not cause some of the pivots in the lever mechanism 4 to be lifted from their bearings with resulting damage when they return. One of the joints 22 is shown in detail in Figure V, the flanges of the I-beam 18 being broken away at the joint to show details. The joint 22 includes four right angle plates 23 each of which is fixed to a web 24 of the beam 18 and to a web 25 of one of the beams 14, the webs 25 of the beams 14 being exposed by cutting away the flanges of the beams at the joints as shown in Figure V. Hence, load upon the weighbridge 3 of the four-section scale may cause flexing of several of the joints 22 without lifting any of the pivots in the lever mechanism 4 from their bearings.

Articulated weighbridges in general are not novel, however, the location of the present joints 22 relative to those suspension bearing members 9 adjacent the extension levers 7 (Figure II) is believed to be new. Heretofore, the joints of articulated weighbridges were directly above or in line with such suspension bearing members forming a simple span. Referring to Figures I and II, the center pair of longitudinally extending I-beams 14 is bolted directly to those suspension bearing members 9 adjacent the extension levers 7 and the end pairs of longitudinally extending I-beams 14 are connected to the end pairs of suspension bearing members 9 by means of short beam blocks 26, the blocks 26 being necessary since the end pairs of suspension bearing members 9 are at an elevation lower than the centrally located suspension bearing members. The joints 22 of the articulated frame 13 are offset from the suspension bearing members 9, as shown in Figure II, to form a cantilever mid-span.

It has been found that the cantilever span design of the weighbridge 3 allows the use of lighter weight structural steel members than those which are used in the simple spans of comparable size in the prior art and at the same time permits loads to be carried that are greater than those possible with such simple spans. It is believed that one reason for such phenomenon is that load upon the center of an articulated, simple span weighbridge causes the mid-section of the weighbridge to bend without affecting the end sections (see Figure IX). Hence, the entire load is borne by the mid-section. In contrast, a similarly placed and equal load upon an articulated, cantilever weighbridge of comparable size (see Figure X) causes the mid-section of the weighbridge to bend and also tips the end-sections of the weighbridge upwardly at the joints. Hence, part of the load is supported by the end-sections and part by the mid-section.

The distribution of the load, when the cantilever design is used, allows the use of lighter weight structural steel members than those possible with simple spans. Thus, one reason that the weighbridge 3 is of rugged build yet includes relatively little steel in its structure is because of its cantilever design. Prior art weighbridges of comparable size are constructed of very heavy longitudinally extending I-beams and instead of the three light reinforcing channel irons 19 and 20 of the present weighbridge the prior art weighbridges include many heavy I-beams.

Another reason that the weighbridge 3 is of rugged build yet includes relatively little steel in its structure is because of the construction of a composite steel and concrete slab or deck 27 carried by the frame 13 and because of the unique way in which said slab or deck is supported. Heretofore, in an effort to save on steel, composite steel and concrete decks included relatively few steel reinforcing rods and as a result such decks were not able to support loads within the capacity of the scale by themselves. The composite steel and concrete slab 27 includes steel reinforcing rods 28 and can support a load within the capacity of the scale by itself. It has been found that the extra weight of the steel used in making a slab which can support such a load may be more than saved by eliminating steel from the framework supporting the slab, since such a slab does not need to be nearly as strongly supported as one which connot support by itself a load within the capacity of the scale.

The framework supporting the slab 27 includes a plurality of spaced apart outrigger elements 29 fixed to the tops of the longitudinally extending I-beams 14, a plurality of longitudinally extending coping channel irons 30 fixed to the outwardly extended ends of the outrigger elements, and a pair of transversely extending coping channel irons 31 carried by the longitudinally extending I-beams 14 at each end of the weighbridge. The channels 30 are spaced apart as indicated at 32 (Figure III) to allow for bending when the joints 22 of the articulated frame 13 are flexed.

The backs of the coping channels 30 and 31 form the outer edges of the weighbridge 3 and the flanges 33 of the channels form the marginal area of the weighbridge. A plurality of snags 34, shown in detail in Figure IV, are secured, as by welding, to the inwardly directed surfaces of the channels 30 and 31. When the composite steel and concrete slab 27 is formed in the coping channel iron framework in the field near the site of the truck scale, metal or wood sheets are first laid between the I-beams 14 to help to support the wet concrete, the steel reinforcing rods 28 are then laid or supported in a criss-cross pattern, and concrete is poured forming the composite steel and concrete slabs 27 which has its peripheral portion embraced by the coping channel irons 30 and 31. The wet concrete flows about the plurality of snags 34 which embedded snags add greatly to the strength of the weighbridge by knitting the coping channels 30 and 31 and the composite steel and concrete slab 27 together. The outrigger elements 29 also become embedded in the peripheral portion of the slab 27 which further strengthens and knits the structure together. Mastic joints 35 (see Figure II) in the slab 27, which are like the joints in a concrete highway, are located above the transversely extending I-beams 18 to allow for bending when the joints 22 in the articulated frame 13 are flexed. The upper surfaces of the I-beams 14, 16 and 18 and the channels 19 and 20 are all at the same level and help to support the slab 27 when the temporary metal or wood forms are removed after the concrete is dry.

Since only a relatively small amount of steel is used in the weighbridge 3 as compared to the amount used in prior art weighbridges, a weighbridge constructed according to the invention results in a very low cost structure. Prior art weighbridges of comparable size have very large steel supports underneath the edges of the composite steel and concrete decks, since such decks cannot support by themselves a load within the capacity of the scale. In contrast, the weighbridge 3 includes the light-weight outrigger elements 29 which are embedded in the concrete of the slab 27 and needs no other support for that part of the slab 27 which overhangs the articulated frame 13. Furthermore, the embedded snags 34 knit the coping channels 30 and 31 and the slab 27 together better than has ever been done before without using a great amount of steel. Prior art weighbridges use many heavy rods and turnbuckles, the rods extending transversely across the weighbridge which may be ten feet wide, to help hold the structure together.

A second embodiment of the invention is illustrated in Figure VI which shows a two-section truck scale embodying the invention. Such a scale is smaller than the four-section scale hereinbefore described and because it is a two-section scale does not need a weighbridge that is articulated. Referring to Figure VI, a weighing scale pit 36 of a two-section truck scale, as well as a cabinet 37 or other supporting means for tare offsetting and load counterbalancing mechanism, may be of any preferred construction, and is illustrated herein merely to show the relation of the improved weighbridge 38 thereto. Lever mechanism 39 may also be of any preferred construction, that illustrated being a seven-lever system comprising two pairs of main levers 40, one pair being located at each end of the pit 36 and each pair extending from their fulcrum stands 41 toward each other (only one pair of main levers 40 is illustrated). Located between the adjacent ends of each pair of main levers 40 and extending toward the center of the pit 36 is an end or extension lever 42, one of which is shown, fulcrumed upon their fulcrum stands 43, one of which is shown. Located between the adajcent ends of the end levers 42, is a transverse lever which is not shown but which is like the transverse lever 8 shown in Figure II. The transverse lever extends perpendicularly to the end levers 42 from its fulcrum stand located near the center of the pit 36 to a point beneath the cabinet 37 and is connected to the offsetting and counterbalancing mechanism of the weighing scale. All of the fulcrum stands are supported upon composite steel and concrete pedestals or piers 44 rising from the floor of the pit 36.

The weighbridge 38 and load are supported at four points, i.e., by the usual load pivots of each main lever 40 upon which rest suspension bearing members 45 that carry the weighbridge. A load causes the main levers 40 to exert a downward pull on each of the two end levers 42. The end levers 42, in turn, exert a downward pull on the transverse lever, which is connected to a steelyard rod (not shown) and, hence, a downward pull on the steelyard rod.

Referring now to Figure VII, the weighbridge 38 includes an I-beam frame 46 comprising a pair of longitudinally extending I-beams 47 and a plurality of reinforcing members 48 holding the I-beams 47 in spaced apart relationship. The reinforcing members 48 include five transversely extending channel irons 49 equally spaced apart along the frame and connecting the I-beams 47 together.

The weighbridge 38 is of rugged build yet includes relatively little steel in its structure because of the construction of a composite steel and concrete slab or deck 50 carried by the frame 46 and because of the unique way in which said slab or deck is supported. The composite slab 50 includes steel reinforcing rods 51 and can support a load within the capacity of the scale by itself. It has been found that the extra weight of the steel used in making a slab which can support such a load may be more than saved by using a relatively light-weight novel framework to support the slab.

The framework supporting the slab 50 includes a plurality of spaced apart outrigger elements 52 fixed to the tops of the longitudinally extending I-beams 47, a plurality of longitudinally extending coping channel irons 53 fixed to the outwardly extended ends of the outrigger elements, and a pair of transversely extending coping channel irons 54 carried by the longitudinally extending I-beams 47 at each end of the weighbridge.

The backs of the coping channels 53 and 54 form the outer edges of the weighbridge 38 and the flanges 55 of the channels form the marginal area of the weighbridge. A plurality of snags 56, similar to the snags 34 one of which is shown in detail in Figure IV, are secured, as by welding to the inwardly directed surfaces of the coping channels 53 and 54. When the composite steel and concrete slab 50 is formed in the coping channel iron frame work in the field near the site of the truck scale, metal or wood sheets are first laid between the I-beams 47 to help support the wet concrete, the steel reinforcing rods 51 are then laid or supported in a crisscross pattern, and concrete is poured forming the composite steel and concrete slab 50 which has its peripheral portion embraced by the coping channel irons 53 and 54. The wet concrete flows about the plurality of snags 56 which embedded snags add greatly to the strength of the weighbridge by knitting the coping channels 53 and 54 and the composite steel and concrete slab 50 together. The outrigger elements 52 also become embedded in the peripheral portion of the slab 50 which further strengthens and knits the structure together. The upper surfaces of the I-beams 47 and the channels 49 are all at the same level and help to support the slab 50 when the temporary metal or wood forms are removed after the concrete is dry.

Since only a relatively small amount of steel is used in the weighbridge 38 as compared to the amount used in prior art weighbridges, a weighbridge constructed according to the invention results in a very low cost structure. Prior art weighbridges of comparable size have very large steel supports underneath the edges of the composite steel and concrete decks, since such decks cannot support by themselves a load within the capacity of the scale. In contrast, the weighbridge 38 includes the light-weight outrigger elements 52 which are embedded in the concrete of the slab 50 and needs no other support for that part of the slab which overhangs the I-beams 47. Furthermore, the embedded snags 56 knit the coping channels 53 and 54 together better than has ever been done before without using a great amount of steel.

The action of a non-articulated weighbridge 57 of a four-section scale under load is shown schematically in Figure VIII. Bending of the weighbridge causes bearings in the lever mechanism to separate from their load pivots 58 at the ends of the scale. When the load is removed, the bearings drop back into place and pound the pivots which dulls the pivots and affects the accuracy of the scale. Such a weighbridge may be found in the early prior art.

The action of an articulated, simple span weighbridge 59 of a four-section scale under load is shown schematically in Figure IX. Bending of the mid-section of the weighbridge causes joints 60 to flex permitting the end-sections of the weighbridge to remain horizontal. No separation between load pivots 61 and bearings occurs so that the articulated weighbridge may be said to be a big step forward in the art. Such a weighbridge may be found in the recent prior art. However, the articulated weighbridge of simple span design is not entirely satisfactory. Because of the simple span design, the entire load is borne by the mid-section of the weighbridge 59, as shown in Figure IX, so that each section of the weighbridge must be designed to carry by itself any load within the capacity of the scale. Such a design wastes expensive steel.

The action of the articulated weighbridge 3 of cantilever span design according to the invention is shown schematically in Figure X. Bending of the mid-section of the weighbridge 3 causes joints 22 to flex and also tips the end-sections of the weighbridge upwardly at the joints. Counterweight provided by the over-hanging portions of the mid-section as well as by the end-sections at the joints helps to support the load. The distribution of the load over the entire cantilever weighbridge 3, in contrast to the concentration of the load over the mid-section of the simple span weighbridge 59, allows the use of lighter weight structural steel members than those possible with simple spans.

Various modifications in details of construction of the parts of the weighbridges may be made without departing from the spirit and scope of the invention.

Having described the invention, we claim:

1. A weighbridge that comprises a frame, a slab carried by the frame, a portion of the slab overhanging the frame, channel members embracing the peripheral portion of the slab, the backs of the channel members forming the outer edges of the weighbridge and the flanges of the channel members forming the marginal area of the weighbridge, and means for fixing the slab and the channel members to the frame, said means comprising a plurality of spaced outrigger elements secured to channel members and to the frame and embedded in the slab at the overhanging portion of the slab.

2. In a weighing scale, in combination, lever mechanism, suspension bearing members carried by the lever mechanism, and a weighbridge that is carried by the suspension bearing members and that comprises a frame, a slab carried by the frame, a portion of the slab overhanging the frame, channel members embracing the peripheral portion of the slab, the backs of the channel members forming the outer edges of the weighbridge and the flanges of the channel members forming the marginal area of the weighbridge, and means for fixing the slab and the channel members to the frame, said means comprising a plurality of spaced outrigger elements secured to channel members and to the frame and embedded in the slab at the overhanging portion of the slab.

3. In a weighing scale, in combination, lever mechanism arranged in a generally longitudinal direction, sets of suspension bearing members carried by the lever mechanism and spaced longitudinally therealong, and a transversely articulated weighbridge that is carried by the suspension bearing members, each transverse joint of the weighbridge being located near a set of suspension bearing members but being offset therefrom whereby a portion of the weighbridge at said joint overhangs said set of suspension bearing members.

4. In a weighing scale, in combination, lever mechanism arranged in a generally longitudinal direction, sets of suspension bearing members carried by the lever mechanism and spaced longitudinally therealong, and a weighbridge that is carried by the suspension bearing members and that has a pair of longitudinally spaced transverse joints, said weighbridge having a cantilever portion at each of the joints.

5. In a weighing scale, in combination, lever mechanism arranged in a generally longitudinal direction, suspension bearing members carried by the lever mechanism, and a weighbridge that is carried by the suspension bearing members and that comprises a frame, a slab carried by the frame, channel members embracing the peripheral portion of the slab, the backs of the channel members forming the outer edges of the weighbridge and the flanges of the channel members forming the marginal area of the weighbridge, and a plurality of transverse joints, each joint being offset longitudinally from the nearest of the suspension bearing members whereby a portion of the weighbridge at each joint overhangs said nearest of the suspension bearing members.

6. In a weighing scale, in combination, lever mechanism arranged in a generally longitudirnal direction, suspension bearinrg members carried by the lever mechanism, and a weighbridge that is carried by the suspension bearing members and that comprises a frame, a slab carried by the frame, channel members embracing the peripheral portion of the slab, the backs of the channel members forming the outer edges of the weighbridge and the flanges of the channel members forming the marginal area of the weighbridge, and a plurality of transverse joints, said weighbridge having a cantilever portion at each of the joints.

References Cited in the file of this patent

UNITED STATES PATENTS

| Number | Name | Date |
|---|---|---|
| 983,990 | Gilbert | Feb. 14, 1911 |
| 1,168,496 | Grundman | Jan. 18, 1916 |
| 1,250,750 | Youngstrom | Dec. 18, 1917 |
| 1,574,112 | Reeves | Feb. 23, 1926 |
| 1,867,615 | Davis | July 19, 1932 |
| 1,912,290 | Marks | May 30, 1933 |
| 2,088,354 | Ward | July 27, 1937 |
| 2,162,622 | Lindsay | June 13, 1939 |

FOREIGN PATENTS

| | | |
|---|---|---|
| 133,316 | Australia | July 14, 1949 |

OTHER REFERENCES

"Industrial Weighing," by D. M. Considine, published by Reinhold Publishing Corp., 330 W. 42nd Street, New York, N.Y., page 88 relied on.